United States Patent
Hu (10) Patent No.: US 10,782,569 B2
(45) Date of Patent: Sep. 22, 2020

(54) DISPLAY PANEL AND A DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Yunqin Hu, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/254,595

(22) Filed: Jan. 23, 2019

(65) Prior Publication Data

US 2020/0103689 A1 Apr. 2, 2020

Related U.S. Application Data

(63) Continuation of application No. PCT/CN2018/113297, filed on Nov. 1, 2018.

(30) Foreign Application Priority Data

Sep. 30, 2018 (CN) .................. 2018 2 1620644 U (51) Int. Cl.
  *G02F 1/1339* (2006.01)
  *G02F 1/1333* (2006.01)
(52) U.S. Cl.
  CPC ........ *G02F 1/13394* (2013.01); *G02F 1/1339* (2013.01); *G02F 2001/13396* (2013.01); *G02F 2001/133354* (2013.01)

(58) Field of Classification Search
  CPC .............. G02F 1/1339; G02F 1/13394; G02F 2001/13396; G02F 2001/133354; H01J 2329/863; H01L 2223/54426; G03F 9/7073; G03F 9/7084
  See application file for complete search history.

(56) References Cited

U.S. PATENT DOCUMENTS 5,852,484 A * 12/1998 Inoue .................... G02F 1/1334
349/86
2004/0105065 A1* 6/2004 Jung ..................... G02F 1/1341
349/153

FOREIGN PATENT DOCUMENTS

| CN | 102289111 A | 12/2011 |
| CN | 106154652 A | 11/2016 |
| CN | 106707633 A | 5/2017 |
| CN | 106990620 A | 7/2017 |
| KR | 20070024234 A | 3/2007 |

OTHER PUBLICATIONS

English language translation of Chinese Patent Application Publication No. CN102289111; translation downloaded from Espacenet at https://worldwide.espacenet.com/; translation into English provided by translate tool on site. (Year: 2011).*

* cited by examiner

*Primary Examiner* — Angela K Davison (57) ABSTRACT

The present disclosure provides a display panel and a display device, the display panel includes a frame glue, an alignment mark, and a blocking wall, and the blocking wall is defined between the alignment mark and the frame glue.

18 Claims, 4 Drawing Sheets

DISPLAY PANEL AND A DISPLAY DEVICE

CROSS REFERENCE TO RELATED APPLICATIONS

The present application is a Continuation Application of PCT Application No. PCT/CN2018/113297 filed on Nov. 1, 2018, which claims the benefit of Chinese Patent Application No. 201821620644.0 filed on Sep. 30, 2018. All the above are hereby incorporated by reference.

FIELD

The exemplary embodiment of the present disclosure generally relates to the technical field of liquid crystal display, and more particularly relates to a display panel and a display device using the display panel.

BACKGROUND

In recent years, narrow border display panels (such as liquid crystal display panels) have become more and more popular in the market. As the frame of the display panel is designed to become more and more narrow, the distance between the frame glue and the edge of the substrate in the display panel becomes closer and closer. Here, if coating the frame glue is conducted, it will easily cause the frame glue to overflow during pressing process to shield the alignment mark, thus causing the alignment mark unable to be correctly identified in the back-end manufacturing process, therefore the yield is reduced.

SUMMARY

It is therefore one main object of the disclosure to provide a display panel, which aims to improve the production yield of the display panel.

In order to realize the above aim, the display panel provided by the present disclosure includes:
  a first substrate;
  a second substrate, facing the first substrate;
  a display medium, defined between the first substrate and the second substrate;
  a frame glue, defined between the first substrate and the second substrate, and surrounding the display medium;
  an alignment mark, defined between the first substrate and the second substrate, and defined at the outside the frame glue; and
  a blocking wall, defined between the first substrate and the second substrate, and the blocking wall is defined between the alignment mark and the frame glue.

Electively, the blocking wall comprises a first sub blocking wall and a second sub blocking wall, the first sub blocking wall is transversely defined between the alignment mark and the frame glue, and the second sub blocking wall is transversely defined between the first sub blocking wall and the frame glue.

Electively, the first sub blocking wall is protruded on the first substrate, and extends toward the second substrate, and an end of the first sub blocking wall away from the first substrate is spaced apart from the second substrate;

the second sub blocking wall is protruded on the first substrate, and extends toward the second substrate, and an end of the second sub blocking wall away from the first substrate is spaced apart from the second substrate.

Electively, a groove is defined on a surface of the second substrate facing the first substrate, and the groove is transversely defined between the alignment mark and the frame glue, and defined between the first sub blocking wall and the second sub blocking wall.

Electively, the first sub blocking wall is protruded on the first substrate, and extends toward the second substrate, and an end of the first sub blocking wall away from the first substrate is spaced apart from the second substrate;

the second sub blocking wall is protruded on the second substrate, and extends toward the first substrate, and an end of the second sub blocking wall away from the second substrate is spaced apart from the first substrate.

Electively, the first sub blocking wall is parallel with the second sub blocking wall, and the distance between the first sub blocking wall and the second sub blocking wall is not less than 20 micrometers.

Electively, the second sub blocking wall extends along a surrounding direction of an outer contour of the frame glue.

Electively, the alignment mark is defined at a corner of the display panel, the first sub blocking wall comprises a first end and a second end both extending along a surface of first substrate, and the first end and the second end respectively extend toward two sides of the corner to surround the alignment mark at the corner.

The present disclosure further provides a display panel, the display panel includes:
  a first substrate;
  a second substrate, facing the first substrate;
  a display medium, defined between the first substrate and the second substrate;
  a frame glue, defined between the first substrate and the second substrate and surrounding the display medium;
  an alignment mark, defined between the first substrate and the second substrate, and defined at the outside the frame glue; and
  a blocking wall, defined between the first substrate and the second substrate, and the blocking wall is defined between the alignment mark and the frame glue;
  the blocking wall comprises a first sub blocking wall and a second sub blocking wall, the first sub blocking wall is transversely defined between the alignment mark and the frame glue, and the second sub blocking wall is transversely defined between the first sub blocking wall and the frame glue;
  the first sub blocking wall is protruded on the first substrate, and extends toward the second substrate, and an end of the first sub blocking wall away from the first substrate is spaced apart from the second substrate, the second sub blocking wall is protruded on the first substrate, and extends toward the second substrate, and an end of the second sub blocking wall away from the first substrate is spaced apart from the second substrate;
  a groove is defined on a surface of the second substrate facing the first substrate, and the groove is transversely defined between the alignment mark and the frame glue, and defined between the first sub blocking wall and the second sub blocking wall, the groove has a width of 20 micrometers to 1000 micrometers; and
  the first sub blocking wall defines a mansard structure or an arc structure, the second sub blocking wall defines a mansard structure or an arc structure.

The present disclosure further provides a display device which includes a display panel, the display panel includes:
  a first substrate;
  a second substrate, facing the first substrate;
  a display medium, defined between the first substrate and the second substrate;

a frame glue, defined between the first substrate and the second substrate, and surrounding the display medium;

an alignment mark, defined between the first substrate and the second substrate, and defined at the outside the frame glue; and a blocking wall, defined between the first substrate and the second substrate, and the blocking wall is defined between the alignment mark and the frame glue.

According to the technical solution of the present disclosure, the blocking wall is transversely defined between the alignment mark and the frame glue. The frame glue must bypass the blocking wall first, and then the frame glue has the opportunity to shield the alignment mark before the frame glue flows to and shield the alignment mark. That is, the blocking wall, transversely defined between the alignment mark and the frame glue, can play a role in blocking the frame glue from flowing to the alignment mark, thereby effectively reducing the possibility of the frame glue shielding the alignment mark, and improving the alignment accuracy between the first substrate and the second substrate, such the production yield of the display panel is improved.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure, and that those having ordinary skill in the art will be able to obtain other drawings based on the arrangements shown in these drawings without making inventive efforts.

Labels Illustration for Drawings.

| Label | Name |
|-------|------|
| 100 | display panel |
| 10 | first substrate |
| 20 | second substrate |
| 30 | frame glue |
| 40 | alignment mark |
| 50 | blocking wall |
| 51 | first sub blocking wall |
| 53 | second sub blocking wall |
| 60 | groove |

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In the description of the present disclosure, the meaning of "a plurality of" can be two or at least two.

It should be further noted that in depictions of the present disclosure, terms such as "connect" should be understood in a broad sense, unless otherwise prescribed or defined explicitly. In other words, the connection can be a fixed connection, a removable connection or an integral connection. Of course, the connection can also be a direct connection, an indirect connection via an intermediary, or an internal communication between two elements. For a person having ordinary skills in the art, he/she can understand specific meanings of the above terms in the present disclosure upon specific situations.

In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure provides a display panel 100, which is applied to display devices (e.g., liquid crystal displays, liquid crystal televisions, cell phones, tablet computers, etc.) to reduce the possibility that the frame glue 30 shields the alignment marks 40 and to improve the production yield of the display panel 100.

The specific structure of the display panel 100 can be described below.

Figure 1:
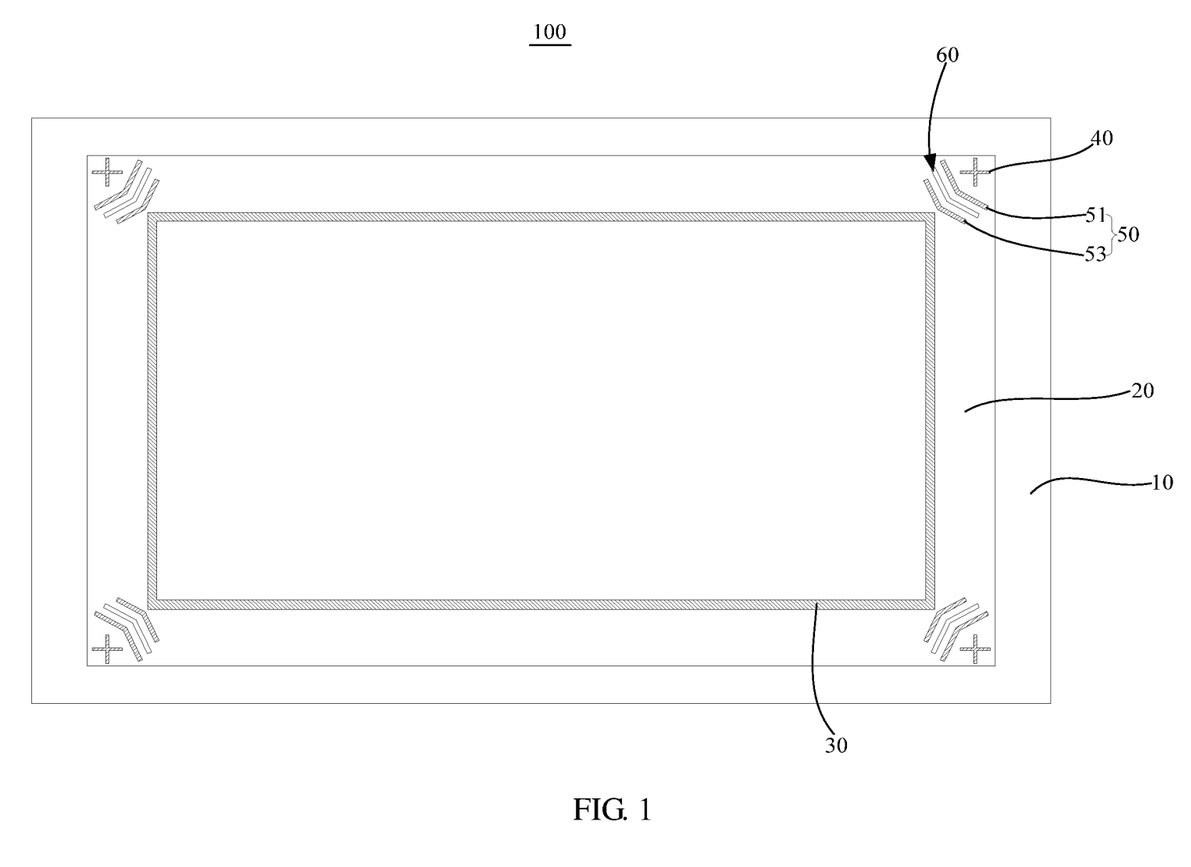
FIG. 1 is a top plan view of the display panel of the present disclosure according to some embodiments.
Figure 2:
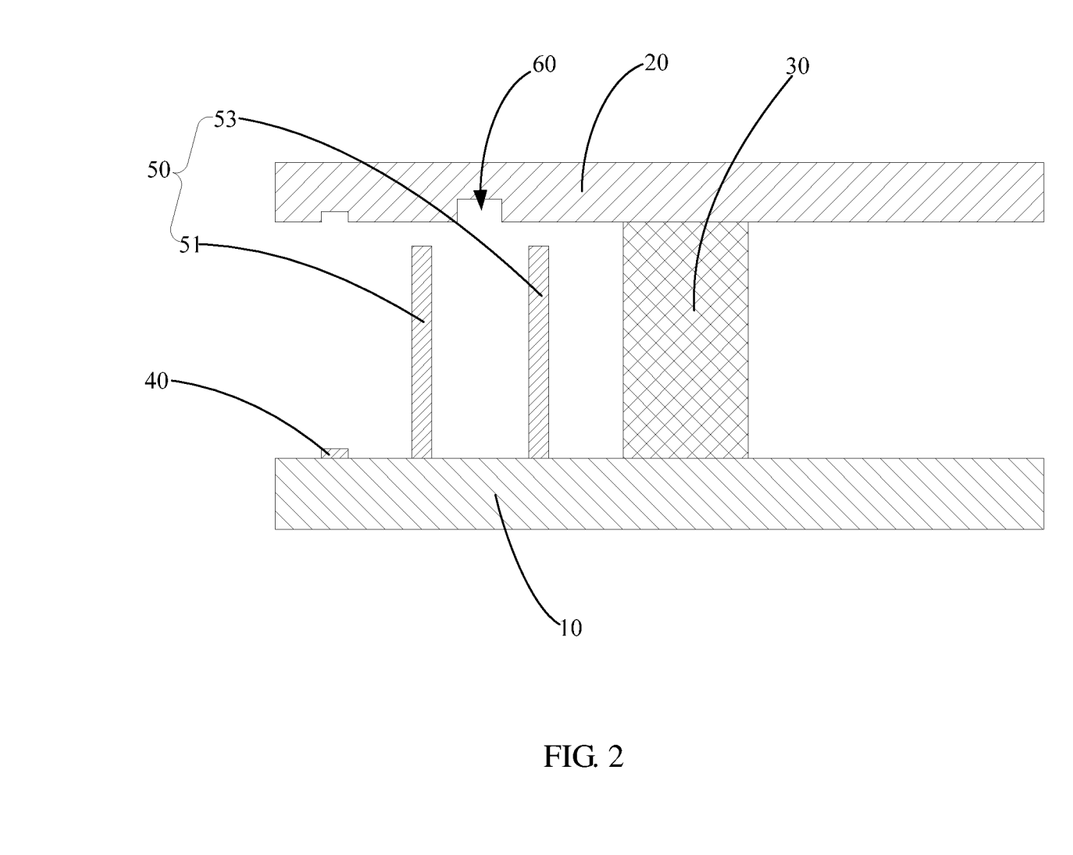
FIG. 2 is a cross section diagram of a portion of the display panel shown in FIG. 1.

As shown in FIGS. 1 and 2, in some embodiments of the display panel 100 of the present disclosure, the display panel 100 includes:

a first substrate 10;

a second substrate 20, facing the first substrate 10;

a display medium (not shown), defined between the first substrate 10 and the second substrate 20;

a frame glue 30, defined between the first substrate 10 and the second substrate 20, and surrounding the display medium;

an alignment mark 40, defined between the first substrate 10 and the second substrate 20, and defined at the outside the frame glue 30; and a blocking wall 50, defined between the first substrate 10 and the second substrate 20, and the blocking wall 50 is defined between the alignment mark 40 and the frame glue 30.

Specifically, the display panel 100 may be a liquid crystal display panel, an organic electroluminescent display panel, or an electrophoretic display panel. Correspondingly, the display medium may be a liquid crystal layer, an organic electroluminescent layer, or an electrophoretic liquid layer. Furthermore, the frame glue 30 is configured to seal the display medium and limit the display medium between the first substrate 10 and the second substrate 20. In the following, the display panel 100 can be the liquid crystal display panel, the first substrate 10 can be the thin film transistor (TFT), and the second substrate 20 can be the color filter (CF), a description is made to the example.

The alignment mark 40 may be defined on either the first substrate 10 or the second substrate 20. The alignment mark 40 may have a cross shape like "+", a shape like "*", or the like, and the alignment mark 40 may be either a solid pattern or a hollow pattern. For example, when the alignment mark 40 is located on the first substrate 10, the alignment mark 40 may be manufactured together with the metal layer in the thin film transistor array substrate (TFT), and at this time, the alignment mark 40 may be a cross-shaped solid pattern. When the alignment mark 40 is located on the second substrate 20, the alignment mark 40 can be manufactured together with the black matrix in the color filter (CF), and at this time, the alignment mark 40 can be a cross-shaped hollow pattern.

In some embodiments, the blocking wall 50 is protruded on the surface of the first substrate 10 facing the second substrate 20, and extends toward the second substrate 20, and the end (upper end) of the blocking wall 50 away from the first substrate 10 is spaced apart from the second substrate 20 to avoid abutting against the second substrate 20 and prevent adverse effects on the cell gap of the liquid crystal cell. Under the condition that the frame glue 30 does not overflow, the blocking wall 50 may be transversely arranged between the alignment mark 40 and the frame glue 30, the blocking wall 50 can either be in a mansard shape (e.g., a "L" shape) or in an arc shape (e.g., a circular arc shape). That is, the blocking wall 50 is located at the outside the frame glue 30. However, when the frame glue 30 overflows, the width of the frame glue 30 would obviously widen and flow toward the alignment mark 40. At this time, the blocking wall 50 transversely defined between the alignment mark 40 and the frame glue 30 can act as a barrier to the continued flow of the frame glue 30, thereby effectively reducing the possibility of the frame glue 30 shielding the alignment mark 40.

Therefore, it can be understood that according to the technical solution of the present disclosure, the blocking wall 50 is transversely defined between the alignment mark 40 and the frame glue 30, the frame glue 30 must bypass the blocking wall 50 first, and then the frame glue 30 has the opportunity to shield the alignment mark 40 before the frame glue 30 flows to and shield the alignment mark 40. That is, the blocking wall 50 transversely defined between the alignment mark 40 and the frame glue 30 can play a role in blocking the frame glue 30 from flowing to the alignment mark 40, thereby effectively reducing the possibility that the frame glue 30 shields the alignment mark 40, the accuracy of alignment between the first substrate 10 and the second substrate 20 is improved, and the production yield of the display panel 100 is also improved.

In addition, the blocking wall 50 may be a color barrier wall 50, that is, the material of the blocking wall 50 is the same as that of the color barrier. At this time, the blocking wall 50 can be made together with the color resistor to simplify the process flow. Of course, the blocking wall 50 may also be a spacer (PS) blocking wall 50, that is, the material of the blocking wall 50 is the same as that of the spacer (PS). At this time, the blocking wall 50 can be made together with the spacer (PS) to simplify the process flow.

As shown in FIGS. 1 and 2, in some embodiments of the display panel 100 of the present disclosure, the blocking wall 50 includes a first sub blocking wall 51 and a second sub blocking wall 53, the first sub blocking wall 51 is transversely defined between the alignment mark 40 and the frame glue 30, and the second sub blocking wall 53 is transversely defined between the first sub blocking wall 51 and the frame glue 30. In this way, the number of obstacles between the alignment mark 40 and the frame glue 30 that can prevent the frame glue 30 from flowing to the alignment mark 40 is increased. At this time, if the frame glue 30 overflows, at least two sub blocking walls should be bypassed to shield the alignment mark 40. Therefore, the possibility that the frame glue 30 shields the alignment mark 40 can be further reduced, and the accuracy of alignment between the first substrate 10 and the second substrate 20 and the yield of the display panel 100 can be further improved.

As shown in FIGS. 1 and 2, in some embodiments of the display panel 100 of the present disclosure, the first sub blocking wall 51 is protruded on the first substrate 10 and extends toward the second substrate 20, and the end of the first sub blocking wall 51 away from the first substrate 10 is spaced apart from the second substrate 20.

The second sub blocking wall 53 protrudes from the first substrate 10 and extends toward the second substrate 20. The end of the second sub blocking wall 53 away from the first substrate 10 is spaced from the second substrate 20.

In this way, not only can the double blocking of the frame glue 30 be effectively realized, but also the structure is simple, the production is convenient, and the stability and reliability are high.

As shown in FIGS. 1 and 2, in some embodiments of the display panel 100 of the present disclosure, a groove 60 is formed on the surface of the second substrate 20 facing the first substrate 10, and the groove 60 is transversely located between the alignment mark 40 and the frame glue 30, and between the first sub blocking wall 51 and the second sub blocking wall 53.

It can be understood that the design of the groove 60 is equivalent to adding another obstacle to the overflow of the frame glue 30, and the frame glue 30 must fill the groove 60 before it can cross this obstacle. In this way, the number of obstacles between the alignment mark 40 and the frame glue 30 that can prevent the frame glue 30 from flowing to the alignment mark 40 is increased. At this time, if the frame glue 30 overflows, the alignment mark 40 can only be shielded after the frame glue 30 first bypassing one sub blocking wall 50, then filling the groove 60 between the two sub blocking walls, and finally bypassing one sub blocking wall 50. In this way, the possibility that the frame glue 30 shields the alignment mark 40 can be further reduced, and the accuracy of alignment between the first substrate 10 and the second substrate 20 and the yield of the display panel 100 can be further improved.

Moreover, in order to further increase the difficulty of filling and crossing the groove 60 in the overflow process of the frame glue 30 and further reduce the possibility of the frame glue 30 reaching and shielding the alignment mark 40, the groove 60 has a width of 20 micrometers to 1000 micrometers.

Figure 3:
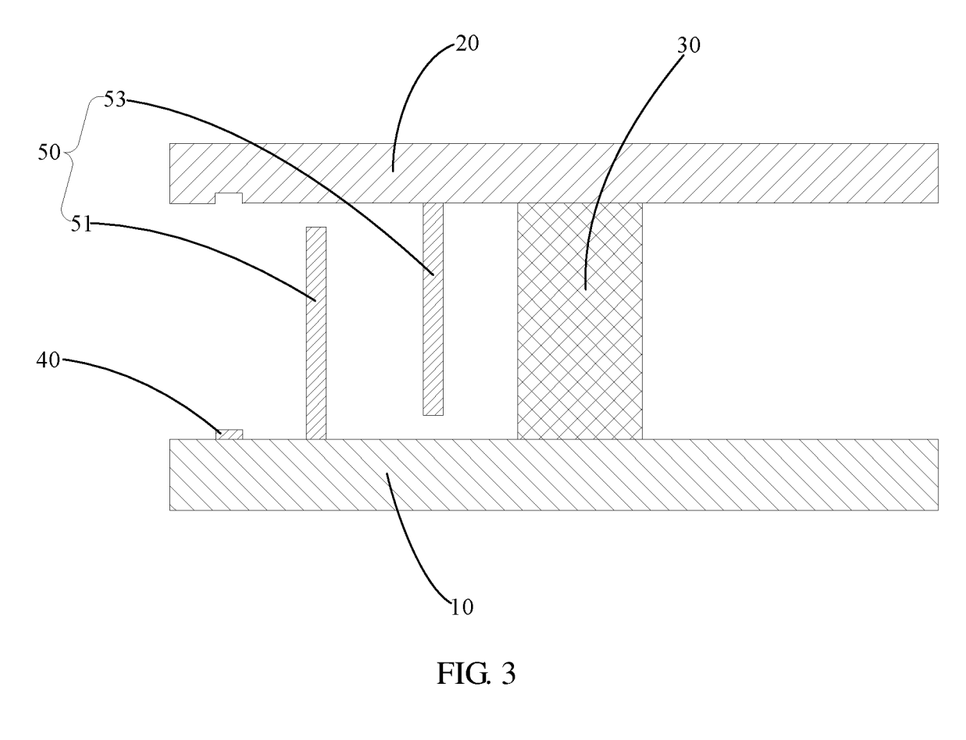
FIG. 3 is a cross section diagram of a portion of the display panel of the present disclosure according to some embodiments.

As shown in FIG. 3, in some embodiments of the display panel 100 of the present disclosure, the first sub blocking wall 51 is protruded on the first substrate 10 and extends toward the second substrate 20, and the end of the first sub blocking wall 51 away from the first substrate 10 is spaced apart from the second substrate 20;

The second sub blocking wall 53 is protruded on the second substrate 20 and extends toward the first substrate 10, and the end of the second sub blocking wall 53 away from the second substrate 20 is spaced apart from the first substrate 10.

In this way, not only can the double blocking of the frame glue 30 be effectively realized, but also the structure is simple, the production is convenient, and the stability and reliability are high. More importantly, with this design, the gaps between one sub blocking wall and the corresponding substrate, and between the other one sub blocking wall and the corresponding substrate are lengthened, further increasing the difficulty for the frame glue 30 to directly cross the two sub blocking walls and reducing the possibility that the frame glue 30 reaches and shields the alignment mark 40.

As shown in FIGS. 1 and 2, in some embodiments of the display panel 100 of the present disclosure, the first sub blocking wall 51 is parallel with the second sub blocking wall 53, and the distance between the first sub blocking wall 51 and the second sub blocking wall 53 is not less than 20 micrometers. In this way, the distance between the two sub blocking walls is large enough, the difficulty of the frame glue 30 bypassing the two sub blocking walls is further increased, and the risk of shielding the alignment mark 40 is further reduced.

Furthermore, the projection length of the first sub blocking wall 51 on the first substrate 10 is larger than the projection length of the second sub blocking wall 53 on the first substrate 10. Thus, after the frame glue 30 bypasses the two ends of the second sub blocking wall 53, the frame glue 30 may flow through more distance to bypass the two ends of the first sub blocking wall 51, thus making it more difficult and less likely for the frame glue 30 to reach the alignment mark 40.

Figure 4:
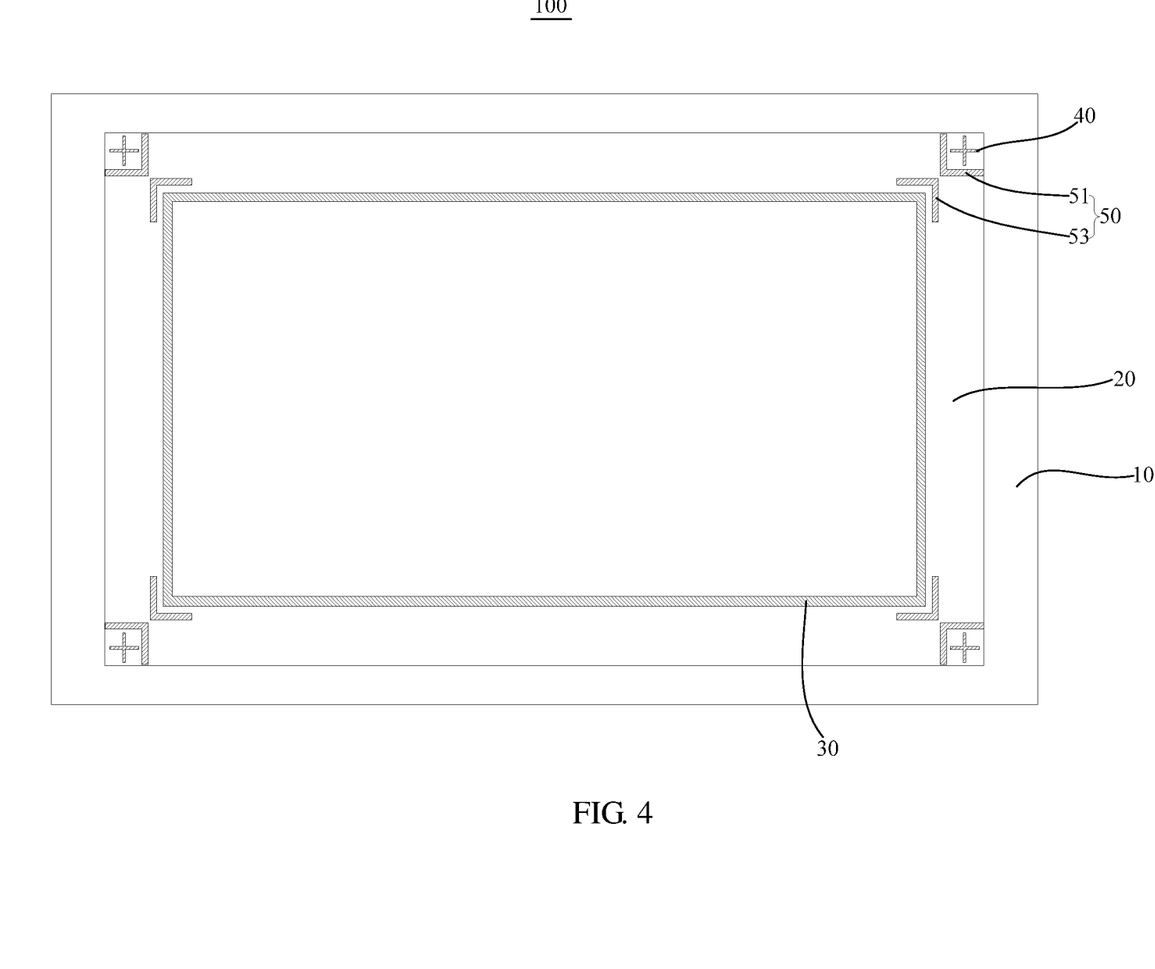
FIG. 4 is a top plan view of the display panel of the present disclosure according to another embodiments.

As shown in FIG. 4, in some embodiments of the display panel 100 of the present disclosure, the second sub blocking wall 53 extends along a surrounding direction of an outer contour of the frame glue 30.

Specifically, the second sub blocking wall 53 is arranged in parallel with the outer contour of the frame glue 30. In this way, two ends of the second sub blocking wall 53 extending along the board surface of the substrate can be far away from the first sub blocking wall 51 and close to the frame glue 30, so that the travel of the frame glue 30 bypassing the end of the second sub blocking wall 53 and then bypassing the end of the first sub blocking wall 51 may be increased, that is, the difficulty of the frame glue 30 bypassing the two sub blocking walls may be further increased, and the risk of shielding the alignment mark 40 may be further reduced.

As shown in FIG. 4, in some embodiments of the display panel 100 of the present disclosure, the alignment mark 40 is located at a corner of the display panel 100, the first sub blocking wall 51 has a first end and a second end both extending along the board surface of the first substrate 10, and the first end and the second end respectively extend toward two sides of the corner to surround the alignment mark 40 at the corner.

In this way, the alignment mark 40 is surrounded by the first sub blocking wall 51 in a relatively independent corner, and the frame glue 30 is difficult to reach, thus further reducing the risk of the alignment mark 40 being shielded.

As shown in FIGS. 1 and 2, in some embodiments of the display panel 100 of the present disclosure, the first sub blocking wall 51 is arranged in a mansard shape (the mansard shape has two or more sections) or arc shape (circular arc, elliptical arc, or other arc shape), so that the structure is simple, the production is convenient, and the stability and reliability are high.

As shown in FIGS. 1 and 2, in some embodiments of the display panel 100 of the present disclosure, the second sub blocking wall 53 is arranged in a mansard shape (the mansard shape has two or more sections) or arc shape (circular arc, elliptical arc, or other arc shape), so that the structure is simple, the production is convenient, and the stability and reliability are high.

In addition, as shown in FIGS. 2 and 3, when the first substrate 10 is the thin film transistor array substrate (TFT), the second substrate 20 is the color filter (CF), and the alignment mark 40 is defined on the first substrate 10, the surface of the second substrate 20 facing the alignment mark 40 is also provided with a light-transmitting groove, the bottom wall of the light-transmitting groove passes through the light shielding layer (BM layer) on the second substrate 20, that is, the light-transmitting groove uses the surface of the glass substrate of the color filter (CF) as the bottom wall, so that the color filter (CF) side can also capture the alignment mark 40. At this time, it can be understood that the light-transmitting groove corresponds to a light-transmitting hole, and the openings at two ends of the light-transmitting hole respectively pass through two surfaces of the light-shielding layer (BM layer).

The present disclosure also provides a display device, the display device includes a display panel 100, the specific structure of the display panel 100 is referred to the above-mentioned embodiments. As the display device provided by the present disclosure adopts all the technical proposals of the above exemplary embodiments, the display device at least has all of the beneficial effects of the technical proposals of the above exemplary embodiments, no need to repeat again. The display device is a displayer, a television, a mobile phone, a tablet computer, or other display devices.

The foregoing description merely depicts some embodiments of the present disclosure and therefore is not intended to limit the scope of the present disclosure. An equivalent structural or flow changes made by using the content of the specification and drawings of the present disclosure, or any direct or indirect present disclosure s of the disclosure on any other related fields shall all fall in the scope of the present disclosure.

What is claimed is:
1. A display panel, wherein the display panel comprises:
a first substrate;
a second substrate, facing the first substrate;
a display medium, defined between the first substrate and the second substrate;
a frame glue, defined between the first substrate and the second substrate, and surrounding the display medium;
an alignment mark, defined between the first substrate and the second substrate, and defined outside the frame glue; and
a blocking wall, defined between the first substrate and the second substrate, and the blocking wall is defined between the alignment mark and the frame glue, wherein, the blocking wall comprises a first sub blocking wall and a second sub blocking wall, the first sub blocking wall is transversely defined between the alignment mark and the frame glue, and the second sub blocking wall is transversely defined between the first sub blocking wall and the frame glue.

2. The display panel according to claim 1, wherein the first sub blocking wall is parallel with the second sub blocking wall, and the distance between the first sub blocking wall and the second sub blocking wall is not less than 20 micrometers.

3. The display panel according to claim 1, wherein the second sub blocking wall extends along a surrounding direction of an outer contour of the frame glue, the alignment mark is defined at a corner of the display panel, the first sub blocking wall comprises a first end and a second end both extending along a surface of first substrate, and the first end and the second end respectively extend toward two sides of the corner to surround the alignment mark at the corner.

4. The display panel according to claim 1, wherein the first sub blocking wall is protruded on the first substrate, and extends toward the second substrate, and an end of the first sub blocking wall away from the first substrate is spaced apart from the second substrate; and
the second sub blocking wall is protruded on the second substrate, and extends toward the first substrate, and an end of the second sub blocking wall away from the second substrate is spaced apart from the first substrate.

5. The display panel according to claim 4, wherein the first sub blocking wall is parallel with the second sub blocking wall, and the distance between the first sub blocking wall and the second sub blocking wall is not less than 20 micrometers.

6. The display panel according to claim 4, wherein the groove has a width of 20 micrometers to 1000 micrometers.

7. The display panel according to claim 4, wherein the second sub blocking wall extends along a surrounding direction of an outer contour of the frame glue, the alignment mark is defined at a corner of the display panel, the first sub blocking wall comprises a first end and a second end both extending along a surface of first substrate, and the first end and the second end respectively extend toward two sides of the corner to surround the alignment mark at the corner.

8. The display panel according to claim 1, wherein the first sub blocking wall is protruded on the first substrate, and extends toward the second substrate, and an end of the first sub blocking wall away from the first substrate is spaced apart from the second substrate; and
the second sub blocking wall is protruded on the first substrate, and extends toward the second substrate, and an end of the second sub blocking wall away from the first substrate is spaced apart from the second substrate.

9. The display panel according to claim 8, wherein a groove is defined on a surface of the second substrate facing the first substrate, and the groove is transversely defined between the alignment mark and the frame glue, and defined between the first sub blocking wall and the second sub blocking wall.

10. The display panel according to claim 9, wherein the first sub blocking wall is parallel with the second sub blocking wall, and the distance between the first sub blocking wall and the second sub blocking wall is not less than 20 micrometers.

11. The display panel according to claim 9, wherein the groove has a width of 20 micrometers to 1000 micrometers.

12. The display panel according to claim 9, wherein the second sub blocking wall extends along a surrounding direction of an outer contour of the frame glue, the alignment mark is defined at a corner of the display panel, the first sub blocking wall comprises a first end and a second end both extending along a surface of first substrate, and the first end and the second end respectively extend toward two sides of the corner to surround the alignment mark at the corner.

13. A display device, comprising a display panel, wherein the display panel comprises:
a first substrate;
a second substrate, facing the first substrate;
a display medium, defined between the first substrate and the second substrate;
a frame glue, defined between the first substrate and the second substrate, and surrounding the display medium;
an alignment mark, defined between the first substrate and the second substrate, and defined outside the frame glue; and
a blocking wall, defined between the first substrate and the second substrate, and the blocking wall is defined between the alignment mark and the frame glue, wherein, the blocking wall comprises a first sub blocking wall and a second sub blocking wall, the first sub blocking wall is transversely defined between the alignment mark and the frame glue, and the second sub blocking wall is transversely defined between the first sub blocking wall and the frame glue.

14. The display device according to claim 13, wherein the first sub blocking wall is protruded on the first substrate, and extends toward the second substrate, and an end of the first sub blocking wall away from the first substrate is spaced apart from the second substrate; and
the second sub blocking wall is protruded on the second substrate, and extends toward the first substrate, and an end of the second sub blocking wall away from the second substrate is spaced apart from the first substrate.

15. The display device according to claim 13, wherein the second sub blocking wall extends along a surrounding direction of an outer contour of the frame glue, the alignment mark is defined at a corner of the display panel, the first sub blocking wall comprises a first end and a second end both extending along a surface of first substrate, and the first end and the second end respectively extend toward two sides of the corner to surround the alignment mark at the corner.

16. The display device according to claim 13, wherein the first sub blocking wall is protruded on the first substrate, and extends toward the second substrate, and an end of the first sub blocking wall away from the first substrate is spaced apart from the second substrate; and
the second sub blocking wall is protruded on the first substrate, and extends toward the second substrate, and an end of the second sub blocking wall away from the first substrate is spaced apart from the second substrate.

17. The display device according to claim 16, wherein a groove is defined on a surface of the second substrate facing the first substrate, and the groove is transversely defined between the alignment mark and the frame glue, and defined between the first sub blocking wall and the second sub blocking wall.

18. A display panel, wherein, the display panel comprises:
a first substrate;
a second substrate, facing the first substrate;
a display medium, defined between the first substrate and the second substrate;
a frame glue, defined between the first substrate and the second substrate and surrounding the display medium;
an alignment mark, defined between the first substrate and the second substrate, and defined outside the frame glue; and
a blocking wall, defined between the first substrate and the second substrate, and the blocking wall is defined between the alignment mark and the frame glue;
the blocking wall comprises a first sub blocking wall and a second sub blocking wall, the first sub blocking wall is transversely defined between the alignment mark and the frame glue, and the second sub blocking wall is transversely defined between the first sub blocking wall and the frame glue;

the first sub blocking wall is protruded on the first substrate, and extends toward the second substrate, and an end of the first sub blocking wall away from the first substrate is spaced apart from the second substrate, the second sub blocking wall is protruded on the first substrate, and extends toward the second substrate, and an end of the second sub blocking wall away from the first substrate is spaced apart from the second substrate;

a groove is defined on a surface of the second substrate facing the first substrate, and the groove is transversely defined between the alignment mark and the frame glue, and defined between the first sub blocking wall and the second sub blocking wall, the groove has a width of 20 micrometers to 1000 micrometers; and the first sub blocking wall defines a mansard structure or an arc structure, the second sub blocking wall defines a mansard structure or an arc structure.

* * * * *